(12) United States Patent
Culzoni et al.

(10) Patent No.: US 6,440,245 B1
(45) Date of Patent: Aug. 27, 2002

(54) METHOD FOR ANTICORROSIVE PROTECTION IN SITU OF WELDING JOINTS AND/OR OF DAMAGED COATING AREAS OF METAL PIPES

(75) Inventors: Fernando Culzoni; Enrico Berti, both of Rovigo (IT)

(73) Assignee: Socotherm S.r.L., Rovigo (IT)

( * ) Notice: Subject to any disclaimer, the term of this patent is extended or adjusted under 35 U.S.C. 154(b) by 0 days.

(21) Appl. No.: 09/441,447

(22) Filed: Nov. 17, 1999

(30) Foreign Application Priority Data

Nov. 25, 1998 (IT) .......................................... GE98A0101

(51) Int. Cl.[7] .............................................. B65H 81/00
(52) U.S. Cl. ........................ 156/94; 156/187; 156/392
(58) Field of Search ......................... 156/94, 185, 187, 156/392, 192; 138/99

(56) References Cited

U.S. PATENT DOCUMENTS

| | | | |
|---|---|---|---|
| 3,470,057 A | * | 9/1969 | Stuart, Jr. et al. ........... 156/392 |
| 3,547,731 A | * | 12/1970 | Stuart, Jr. et al. ........... 156/392 |
| 3,865,662 A | * | 2/1975 | Segal ........................... 156/94 |
| 4,008,114 A | * | 2/1977 | Lindsey ....................... 156/392 |
| 4,178,200 A | * | 12/1979 | Hakert et al. ................ 156/187 |
| 4,946,528 A | * | 8/1990 | Takahashi et al. .......... 156/187 |
| 5,451,287 A | * | 9/1995 | Marty ........................... 156/446 |
| 5,589,019 A | * | 12/1996 | Van Beersel et al. ....... 156/184 |

* cited by examiner

Primary Examiner—Michael W. Ball
Assistant Examiner—Barbara J. Musser
(74) Attorney, Agent, or Firm—Larson & Taylor PLC (57) ABSTRACT

Method for the implementation in situ of the three-layer coating with thermoplastic materials for the anticorrosive protection of welding joints of coated metal pipes, and/or of damaged coating areas, by wrapping up a ready-to use sheathing/band or tape, made of thermoplastic materials. The application of the sheathing/band or of the tape onto the joint is carried out mechanically by means of a suitable roll, e.g. in silicone rubber, said roll, carried by a suitable device placed on the pipe in the area to be coated, turning around the pipe wrapping and pressing with the desired pressure the sheathing/band/tape onto the pipe itself and ensuring a strong adherence to the support/pipe and the absence of air bubbles entrapped between the sheathing/tape and the pipe.

14 Claims, 5 Drawing Sheets

METHOD FOR ANTICORROSIVE PROTECTION IN SITU OF WELDING JOINTS AND/OR OF DAMAGED COATING AREAS OF METAL PIPES

BACKGROUND AND SUMMARY OF THE INVENTION

The object of the present invention is a method for the implementation in situ of an anti-corrosive coating made of thermoplastic materials, such as for instance PE/PP (polyethylene/polypropylene), applied onto the welding joints and/or on the damaged areas of the coating of metal pipes used for underground pipelines, and a device for the implementation of said method.

When building underground pipelines (gas-, oil- and water pipelines) metal pipes are normally used, said pipes being externally coated with anti-corrosion thermoplastic materials in suitable areas at the factory or in a suitable yard.

When applying the anticorrosive coating in the plant or in a yard, the ends of said metal tubes are left uncovered (that is to say, they are not provided with the anticorrosive coating) for a certain length, according to the diameter and to the kind of anticorrosive coating, said length being between 50 and 250 mm, so as to be able then to weld the single sections of the tubes, which have been coated in the plant or in a yard, between themselves in situ.

Once the welding of the pipes end has been carried out and checked, it is necessary to coat against corrosion the metal portion which has been left uncovered for the welding and the damaged portions so as to obtain the anticorrosive protection of the whole pipeline with the same physical and mechanic features of the original coating without any weak spots on the pipeline. At present the weak spot of the pipeline is the welding joint, and the renewing systems of the anticorrosive protection for the joints are different and depend, when possible, on the type of coating which has been applied onto the pipe at the factory.

The following systems are used: sealing plastic tapes with cold-application; textile tapes impregnated with various sealing and protective materials such as bitumen, various resins, and so on; powder or liquid resins; thermoretractable plastic sleeves; single- and two-layer coextruded sheathings and tapes, and so on, with suitable known procedures, though substantially manual.

The objective is anyway to give a certain continuity to the anticorrosive protection on the pipe, by means of solutions showing the highest reliability, or better, the same reliability as the protection applied onto the rod.

The present invention relates particularly, but without limitations, to the coating, of the multi-layer type, and preferably also of the three-layer type, in situ, of welding joints and of damaged areas of metal pipes coated at the factory by means of thermoplastic materials, such as for instance PE/PP, according to the DIN specifications DIN 30670 and DIN 30678, and to similar specifications.

A non-limiting plan concerning the stages of the application of the three-layer PE/PP coating in the plant is the following:

blasting of the metal surface of the pipe;

possible washing of the surface with a phosphating agent;

heating of the metal pipe at the required temperature, i.e. 150÷230° C.;

application of a powder/liquid epoxy primer with a thickness of 50÷300 μm;

application of the thermoplastic adhesive with a thickness of 200÷400 μm;

application of the outer PP/PE, or others, thermoplastic material by means of extrusion, with the required thickness, usually between 1 and 4 mm.

Such kind of three-layer PP/PE coating is thought to be the best and most reliable anticorrosive coating existing today for underground pipe-lines; it is moreover extremely important to renew the coating of the welding joints and of the damaged areas by means of materials and procedures ensuring the same features of reliability of the original coating.

At present the anticorrosive protection of the joint is renewed in situ in different ways:

A) for metal pipes with a three-layer PE coating for operative temperatures below 70° C.

blasting of the metal surface for the whole length of the uncovered joint/pipe.

Heating of the portion of blasted pipe normally by means of electric induction.

Possible manual application of epoxy primer.

Manual positioning on the joint of a thermoretractable sleeve made of PE, consisting of an outer layer in PE and of an inner layer in sealing—adhesive material, in such a length as to exceed of about 10 cm the coating present on the rods.

Manual heating of the sleeve by means of a LPG torch (liquefied petroleum gases), till said sleeve is completely suitable for the underlying pipe, trying to let out absorbed air bubbles by heating and pressing manually the sleeve surface repeatedly so as to remove possible air bubbles.

Plastic tapes or coatings based on epoxy resins, PU (polyurethane), and so on, are used as an alternative to the sleeve.

B) For metal pipes with a three-layer PP coating for operative temperatures below 130° C.

As far as PP is concerned there are no thermoretractable sleeves resisting at such high temperatures; therefore, for the coating of welding joints special thermoplastic polypropylene materials are used, said materials being patented for instance by the company Montell, ex Hymont, in powder, sheathing, band and tape form.

The typical procedure followed to carry out the coating includes the following operations:

blasting of the metal surface.

Possible bevel cut of the rim of the surrounding plastic coating.

Heating of the metal surface, preferably by means of electric induction.

Manual application of the liquid or powder primer onto the metal surface, with a brush, a shoes, an electrostatic gun, a flame gun, fluid-bed nozzles possibly mounted and manually operated on a circular template placed around the pipe.

Manual application of adhesive with an electrostatic gun, a flame gun or fluid-bed nozzles possibly mounted and manually operated on a circular template placed around the pipe.

Manual positioning of a two-layer-sheathing/band (with suitable dimensions and after its heating) on the area of the pipe to be coated, said sheathing/band consisting of coextruded PP and adhesive, or manual positioning of a sheathing/band divided between PP and adhesive (as an alternative to the adhesive band it is possible to use powder adhesive).

The sheathing/band is used with or without the overlap of the existing surrounding coating (in case of no overlap the free space is renewed at the end of the application of the sheathing/band by filling it with PP or with its adhesive copolymer by extrusion).

The thickness of the coextruded sheathing/band is preferably the final thickness one wants to obtain without using more layers.

After the sheathing/band is placed onto the tube, said sheathing/band is fixed and pressed onto the tube in different ways by clamping it by means of suitable belts, of thermoretractable tape, of a tubular compressed-air band, of a metal band with one or more sectors, so as to adapt and make it adhere to the substrate.

Possible additional heating of the sheathing/band so as to ensure the complete melting of the adhesive and a suitable melting of the PP.

After the application of the sheathing/band, cooling to the desired temperature.

As an alternative to the sheathing/band, with the same dimension as the area to be coated, it is possible to use a coextruded two-layer tape, made of PP and adhesive, with a thickness preferably below 1 mm, wrapping such tape around the pipe with overlapping of several layers till the required thickness is reached.

Another alternative can be the application, after that of the primer and of the adhesive, of the PP or of the PP copolymer with a flame gun, till the required thickness is reached, overlapping the surrounding PP three-layer coating which has been applied in the plant.

Another common technique is to mount, after the application of the primer and possibly of the adhesive, a ring/mould around the area to be coated, overlapping the surrounding coating area, so as to form a hollow space which is of the same thickness as the desired coating, and to fill said hollow space with the required thermoplastic material by means of an injection press or an extruder.

By means of the aforesaid materials and of the methods used up to now for the application in situ of the anticorrosive coating onto the welding joints and onto the damaged areas of coated pipes with the three-layer procedure it is possible to obtain coatings having acceptable features, though extremely lower than the original coating made at the factory.

The methods used, most of which consist of manual operations depending on the worker's ability, show several critical points and cannot ensure certain times, operative conditions and repeatability in the results [such as, for instance, the correct positioning of the sheathing/band, or of the tape on the pipe; irregular and inhomogeneous stress and pressure the whole length of the sheathing/band, or tape, often resulting in the entrapment of air when the sheathing/band, or tape touches the uncovered pipe and the overlapping areas; the several overlapping of the tape which must be perfectly impermeable and prevent the "curtain-effect" with subsequent air entrapment; the difficulty in obtaining a perfect adhesion of the material which has been applied by extrusion onto the rims of channels which have been left empty while applying the sheathing/band; possible air entrapment during the implementation of the coating with the spray application of the powder by means of a flame gun].

The main object of the present invention is, therefore, to provide a method for the renewal in situ of the anticorrosive protection of the welding joint and of the damaged coating areas avoiding the disadvantages of known techniques, overcoming their critical aspects and carrying out in practice the same anticorrosive protection made at the factory by using the same materials (powder or liquid primer; adhesive copolymers in powder form or in the form of a ready-to use sheathing/band/tape carried out by extrusion; polyolefin thermoplastic materials in the form of a ready-to use sheathing/band/tape carried out by means of extrusion and in the form of a ready-to use sheathing/band/tape carried out by means of coextrusion with the adhesive copolymer).

Another object of the present invention is to provide a mechanized equipment for the implementation of said method, which turns around the pipe and carries out the various working operations required in pre-determined and repeatable working conditions, resulting in a perfectly reliable coating according to the DIN specifications DIN 30670, DIN 30678 and similar.

A form of embodiment of the present invention provides that the application of the sheathing/band/tape in thermoplastic material (for instance PE/PP and adhesive copolymer, separately carried out by means of extrusion, or for instance PE/PP and adhesive copolymer, carried out in a double layer by means of coextrusion) onto the joint/pipe to be coated is carried out mechanically around the pipe by means of a suitable roll, made for instance of silicone rubber, idle or motorised, during its rotatory-revolutionary movement around the pipe and preferably in touch with the pipe itself.

Another feature of the present invention further provides that the sheathing is preferably placed around the pipe by transposition from the rubber roll around which it had been previously wrapped or by feeding from another auxiliary roll around which it had been previously wrapped.

BRIEF DESCRIPTION OF THE DRAWINGS

Further objects and advantages of the present invention will be more evident from the following description of some practical forms of embodiment of said invention, carried out referring to the enclosed drawings, where.

Figure 1:
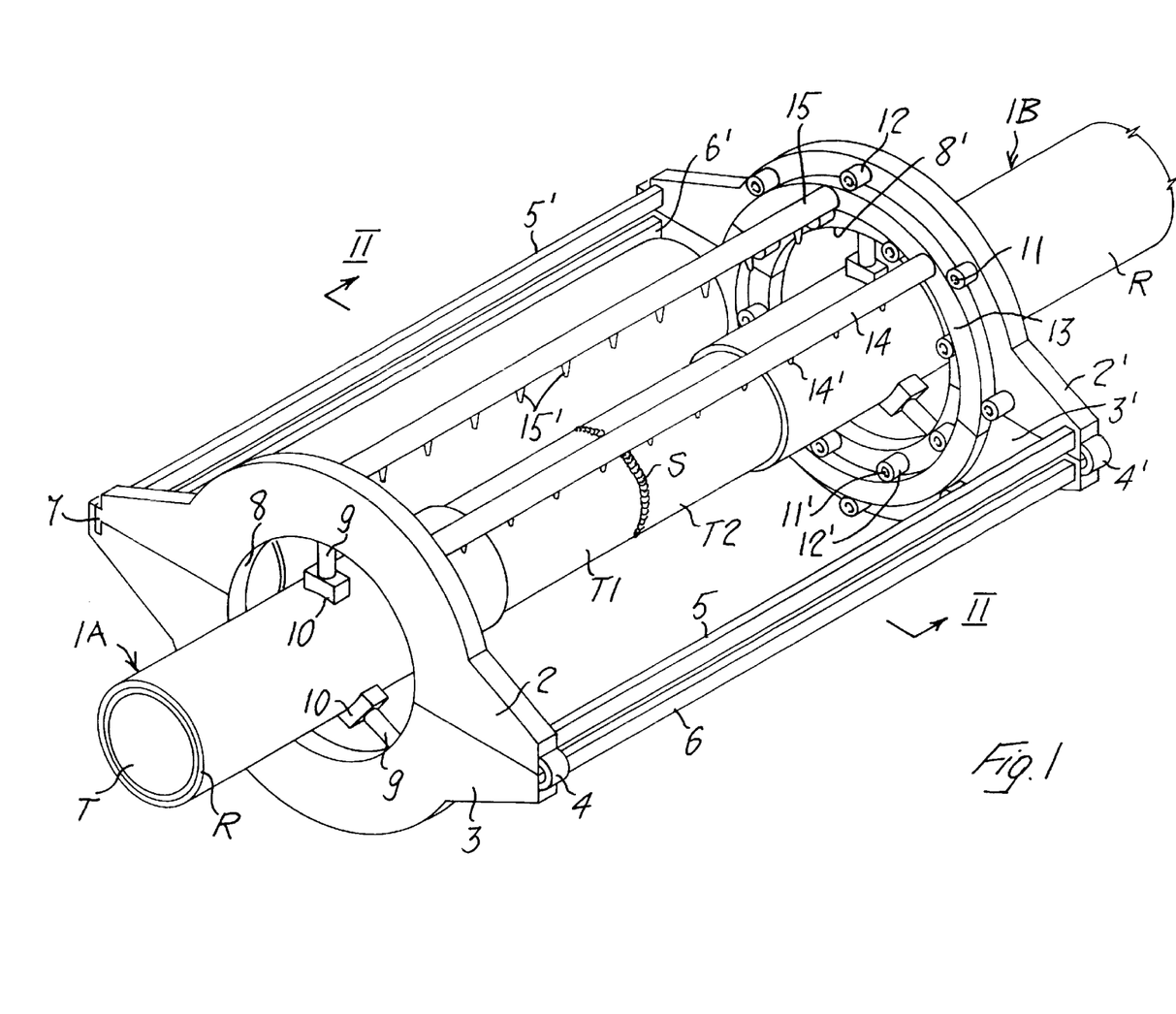
FIG. 1 is an axonometric view of a first form of embodiment of the device according to the invention, placed on a pipe to be coated, according to which the pressing roll carrying the sheathing has a diameter which is the same as or larger than the joint/pipe to be coated and the sheathing to be applied onto the pipe with the required final thickness is wrapped around said pipe in one single layer.
Figure 2:
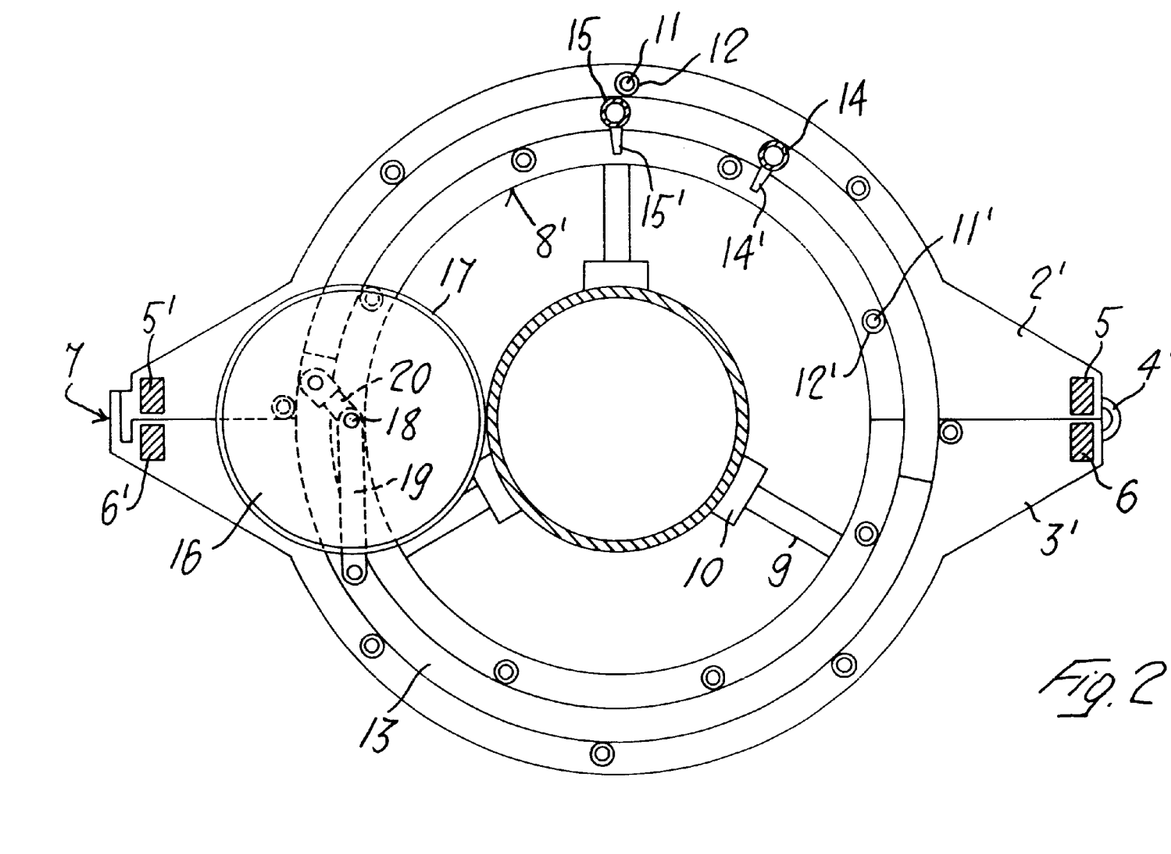
FIG. 2 is a cross section view of said device, substantially taken according to the plane occupying the line II—II in FIG. 1.

1) DESCRIPTION OF THE FORM OF EMBODIMENT IN FIGS. 1 AND 2

Referring to the drawings, and in particular to FIGS. 1 and 2, 1A and 1B indicate two lengths of the metal pipe T provided with an anticorrosive coating R, whose ends T1 and T2, which have been left uncovered, i.e. without the coating R, have been welded one to the other by means of a weld bead S.

In order to provide the uncovered pipe portions T1 and T2 with the necessary anticorrosive protection, said portions are shut in the applying device for the sheathing later described.

As is shown in the figures, said device includes two pairs of jaws 2, 3, 2', 3' hinged one to the other in 4, 4' and stiffly linked one to the other by means of connecting rods 5, 6, 5', 6'. The two pairs of jaws 2, 3, 2', 3' are provided, on the ends opposite to the hinged ones, with releasable means 7 for the blocking in a clamped position. Each of said jaws is provided in its central area with a semicircular opening forming, when the jaw is clamped, a circular opening 8, respectively 8', coaxial one to the other, whose diameter is larger than the maximum diameter of the pipes to be coated.

Cylinders (not shown in the figure) placed in the wall of the circular opening of each jaw 2, 3, respectively 2', 3', show three stems 9 coming out of them in positions at the same angular distance, said stems being connected to the same number of hydraulic or pneumatic pistons (not shown in the figures), mounted so as to slide within said cylinders, having on their free ends shoes 10 for the purposes later described.

On the opposite faces of the jaws 2, 3, respectively 2', 3', two series of pins 11, respectively 11', are keyed along two circular concentric generatrices at the same angular distance, onto which pins two series of rolls 12, 12' are idly mounted. These two series of rolls 12, 12' form the sliding and supporting guide of a broken ring 13. The two split rings 13 (in the figure only the ring 13 supported by the jaws 2', 3' is visible, but a perfectly symmetrically structure is also provided onto the opposite wall of the jaws 2, 3) form the element for supporting and dragging in rotation of:

a) a busrod 14 carrying nozzles 14' for the application of a primer;

b) a busrod 15 carrying nozzles 15' for the application of a adhesive, and c) a device for the pressing and easy joining of a pressing roll 16 (see FIG. 2) covered with a sheathing 17.

In the form of embodiment shown said pressing roll 16 carrying the sheathing to be transposed onto the pipe is preferably made of silicone rubber with a hardness between 5 and 80 Shore A and with the same diameter as or a larger diameter than the joint/pipe to be coated, and the sheathing to be applied onto the pipe with the required final thickness is wrapped around the pipe itself in one single layer.

As better shown in FIG. 2, the rotating rings 13 are provided with easy joinings devices 18 for the pressing roll 16, carried by a pair of articulated arms 19, 20 pivoted on one end between themselves and on the opposite end to the ring 13, one of said arms, to be precise arm 20 in FIG. 2, being equipped with elastic and/or pneumatic means whose function is to constantly push the pressing roll against the pipe portion to be coated again with a pre-determined strength.

A suitable engine (not shown in the figures) controls the rotation of the ring 13, for the purposes which will be later described.

The working of the device described will be evident.

The joint area T1–T2 of the pipe to be coated is first blasted and heated. After that the blocking device 7 for the jaws 2, 3, respectively 2', 3', is released and the cage structure described is opened by rotating the jaws around the hinges 4, 4' so as to place said structure around the pipe area to be coated. Now the jaws are closed and blocked again on the pipe, and the stems 9 are dragged out, so as to make the shoes adhere to the pipe, thus blocking safely the device described onto the pipe coaxially.

Now the rotating portion 13 is set into motion, and first the primer and then the adhesive are applied by the nozzles 14' and 15'. Afterwards, after stopping again the rotating portion, the roll 16, which is already equipped with the sheathing 17 wrapped around it and pre-heated in a suitable oven, is engaged on the easy joining 18 of the rotating portions.

The moving part is then set again into rotation, and therefore the roll 16, pressed by the articulated system 18–20 against the joint T1–T2 of the pipe, turns and wraps the pipe with the sheathing 17.

What follows is a practical example of implementation of the method described with the equipment shown in the FIGS. 1 and 2 of the drawings.

EXAMPLE 1

Anticorrosive coating of welding joint of coated pipes with diameter of 16" and thickness of 19 mm and with 3 mm of PP (polypropylene) and length of the uncovered part of 300 mm, by means of:

powdered epoxy primer copolymer adhesive in PP Montell two-layer coextruded sheathing in polypropylene and adhesive (type Qestron Coat Coex Sheet) with a total thickness of 3,5 mm.

Procedure

The uncovered metal portion of the joint has been blasted with metal shotting degree SA 2.5. The welding joint of the metal pipe has been heated at about 220° C. in an induction furnace.

100–150 microns of epoxy primer and 80–120 micron of powdered adhesive copolymer have been rapidly applied in sequence onto the joint.

In the meanwhile the coextruded two-layer sheathing, previously heated at 120° C. in an oven, and having such a width as to exceed of 100 mm the coating of the welded rods and such a length as to be placed around the tube with an overlapping of 150 mm, has been applied onto the pressing roll. Said pressing roll in silicone rubber, around which the sheathing has been wrapped, has been placed onto a suitable equipment, rolled and pressed onto the sheathing around the pipe so as to obtain a homogeneous adherence of the sheathing avoiding air entrapment.

The data referring to adherence, to impact and to Cathodic Disbonding (C.D.) are shown in Table 1.

Figure 3:
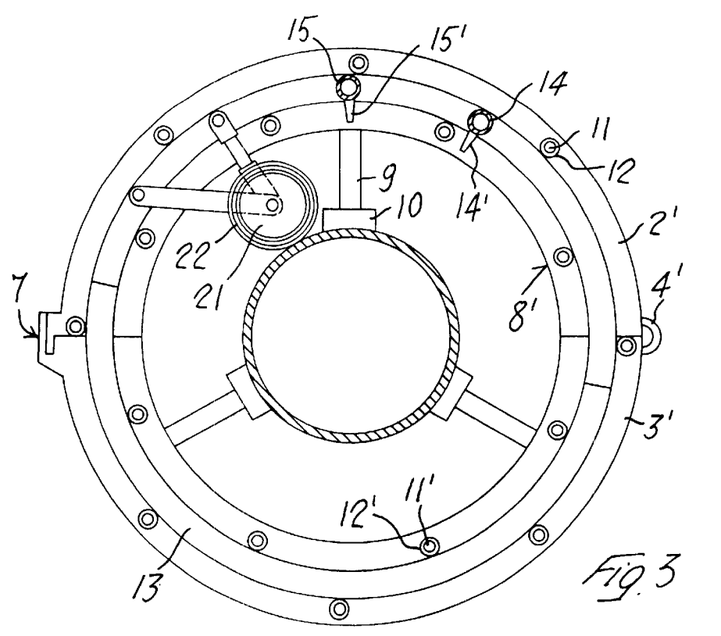
FIG. 3 is a cross section view, similar to that in FIG. 2, of a second form of embodiment of the device according to the present invention, in which the pressing roll has a smaller diameter than the diameter of the joint/pipe to be coated, and the sheathing to be applied onto the pipe is wrapped around said roll in several layers.
Figure 6:
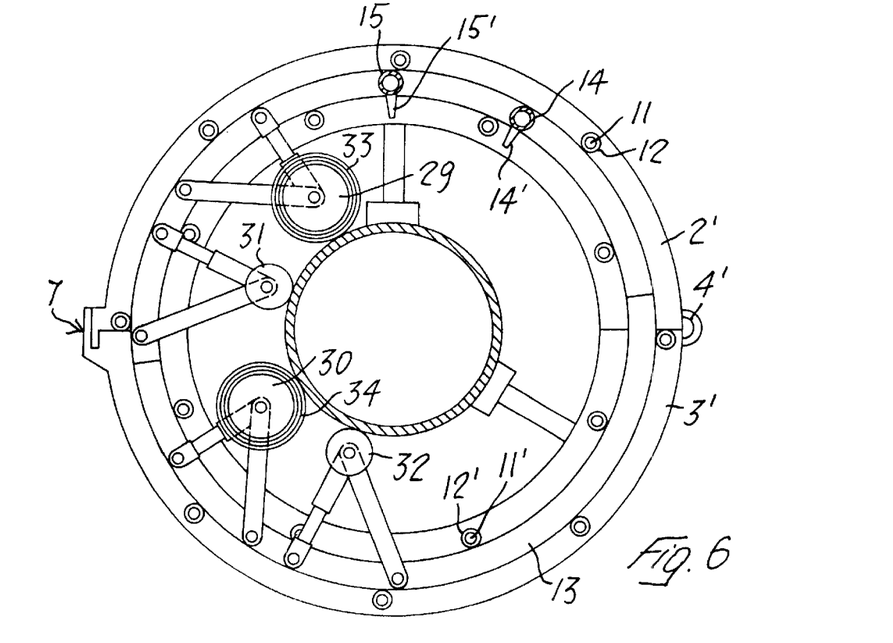
FIG. 6 is a section, similar to that of FIGS. 4 and 5, of another form of embodiment of the device according to the invention, in which, downstream from the two rolls carrying the single-layer sheathings, made of adhesive and PP, two pressing rolls are provided for the application of the sheathings onto the pipe to be coated.

II) Description of the Forms of Embodiment in FIGS. 3 and 6

The device shown in FIG. 3 is substantially analogous to the one described referring to FIGS. 1 and 2, apart from the fact that the pressing roll 21 carrying the sheathing (preferably made of silicone rubber with a hardness between 5 and 80 Shore A) has a smaller diameter than the diameter of the pipe/joint to be coated and the sheathing 22 to be applied onto the pipe, with the required final thickness or with a smaller thickness, for instance between 0.1 and 4 mm, is wrapped around the roll in several layers.

Figure 4:
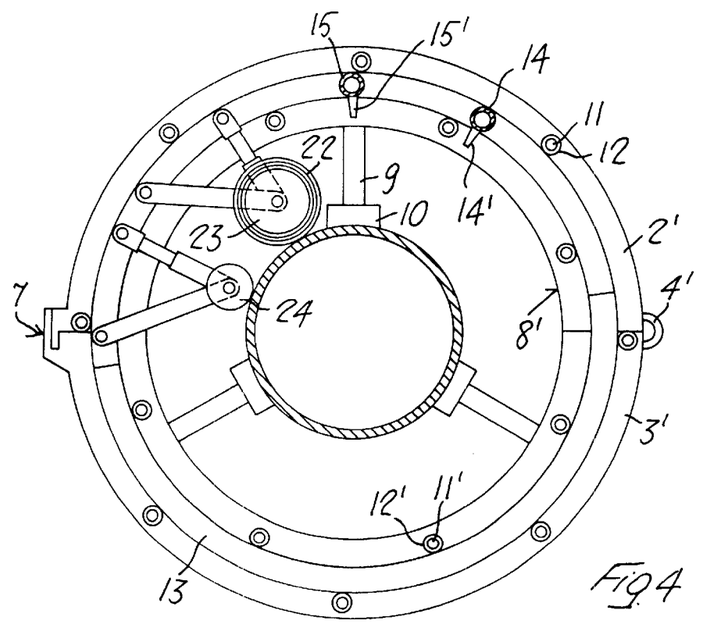
FIG. 4 is a cross section view, similar to that in FIG. 3, of another form of embodiment of the device according to the invention, in which, downstream from the roll carrying the sheathing, there is a pressing roll applying around the joint/pipe the sheathing it receives from the roll carrying the sheathing itself.

The device shown in the form of embodiment in FIG. 4 is substantially analogous to the one in FIGS. 1 and 2, apart from the fact that in said form of embodiment the sheathing 22 is wrapped around an auxiliary roll 23, preferably made of silicone rubber with a hardness between 5 and 80 Shore A, or of PTFE, e.g. Teflon, or of metal coated with PTFE, e.g. Teflon, or of metal coated with silicone rubber having a hardness between 5 and 80 Shore A, preferably with a smaller diameter than the diameter of the pipe/joint to be coated, and the sheathing to be applied onto the pipe, with the required final thickness or with a smaller thickness, e.g. 0.1÷4 mm, is wrapped around the roll in several layers, as described for the form of embodiment in FIG. 3. According to the latter, downwards from the auxiliary roll 23, a pressing roll 24 has been provided, which, with its rotatory-revolutionary movement around the pipe and preferably in touch with the pipe itself, applies around the joint/pipe the sheathing 22, the latter being fed by the roll 23 rotating around the pipe as well. The roll 24 is preferably made of silicone rubber with a hardness between 5 and 80 Shore A and with a diameter preferably between 50 and 300 mm.

Figure 5:
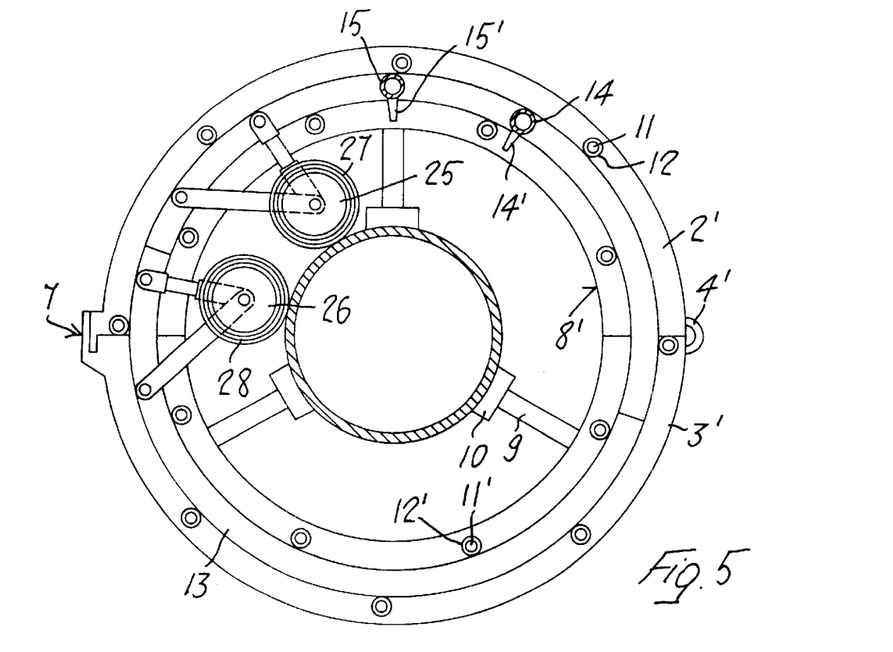
FIG. 5 is a section, similar to that of FIG. 3, of another form of embodiment of the device according to the invention, in which two rolls are provided for the application of single-layer sheathings made of adhesive and PP.

In the form of embodiment of FIG. 5 two pressing rolls 25, 26 are provided, said rolls being analogous to roll 21 in FIG. 3. However, such pressing rolls are wrapped by separate single-layer sheathing 27, 28 (not coextruded) made of adhesive and PP.

Finally, in the form of embodiment in FIG. 6 two pressing rolls 31, 32, analogous to roll 24 in FIG. 4, and two auxiliary rolls 29, 30, analogous to roll 23 in FIG. 4, are provided for the application of separate single-layer sheathings 33, 34 (not coextruded) made of adhesive and PP.

In all the embodiments described above with reference to FIGS. 1 to 6, the pressing roll made of silicone rubber (16; 21; 24; 25; 26; 31; 32), during its rotatory-revolutionary movement around the pipe/joint to be coated and preferably in touch with the pipe itself, is prearranged to exert the necessary pressure in the point of first touch of the sheathing with the pipe so as to adapt perfectly the sheathing around the pipe and on the overlapping of the coating present on the tube sections, and to avoid air entrapments between the sheathing and the pipe.

The pressure exerted by the roll onto the sheathing, the possibility that the roll keeps its movement and pressure around the pipe even after the transposition of the sheathing on the pipe itself, and the softening of the sheathing because of a suitable pre-heating and of the heat it has absorbed from the hot tube with which it comes into touch, result in a perfect shaping and adherence of the sheathing to the support, thus obtaining a coating according to DIN specification DIN 30670, DIN 30678 and similar.

The width of the sheathing/band is such to exceed in the desired extent the coating present on the sections, and the band length in the embodiments shown in the FIGS. 3 to 6 can be such as to be able to coat more than one joint.

The equipment described above to carry out in situ, according to the present invention, the anti-corrosive coating of the welding joint of pipes and of the damaged areas is prearranged so as to execute all the necessary operative stages, that is to say: application of powdered or liquid primer; application of the adhesive in form of powder or ready-to use sheathing; application of the sheathing in thermoplastic material, e.g. PE/PP, in ready-to-use sheathing, extruded or coextruded with the adhesive layer.

The aforesaid structure can also be preferably equipped with wheels leaning onto the pipe, so as to obtain the correct positioning onto the joint.

The equipment for the application of the primer, for instance an epoxy primer, in liquid or powder form, can include, beyond the devices 14 and 15 described, spray guns, pad, electrostatic guns, flame guns, fluid-bed nozzles.

The equipment for the application of the powdered adhesive copolymer can include electrostatic guns, flame guns, fluid-bed nozzles.

What follows are some examples of procedures concerning the forms of embodiment in FIGS. 3 to 6, said examples being mere examples and therefore non limiting.

EXAMPLE 2

Anticorrosive Coating of Joint with Equipment According to the Form of Embodiment in FIG. 3

The procedure is the same as in example 1, apart from the fact that the coextruded two-layer sheathing has been suitably wrapped in several layers around the pressing roll, the latter having then transposed and pressed the sheathing around the pipe.

The data referring to adherence, impact and C.D. are shown in Table 1.

EXAMPLE 3

Anticorrosive Coating of Joint Using the Equipment of the Form of Embodiment in FIG. 4

The procedure is the same as in example 1, apart from the fact that the coextruded two-layer sheathing has been suitably wrapped in several layers around the auxiliary roll, the latter having then fed the pressing roll which, by rolling, transposed and pressed the sheathing around the pipe.

The data referring to adherence, impact and C.D. are shown in Table 1.

EXAMPLE 4

Anticorrosive Coating of Joint Using the Equipment of the Form of Embodiment in FIG. 5

The procedure is the same as in example 2, apart from the fact that, instead of the coextruded polypropylene sheathing, two separate extruded sheathings have been used: an adhesive sheathing 0.2 mm thick and a polypropylene sheathing 1 mm thick.

These two sheathings have been separately wrapped and heated around two pressing rolls, which have then, by sequence rolling, transposed and pressed the sheathings around the pipe.

The data referring to adherence, impact and C.D. are shown in Table 1.

EXAMPLE 5

Anticorrosive Coating of Joint Using the Equipment of the Form of Embodiment in FIG. 3

The procedure is the same as in example 2, apart from the fact that the pre-heated coextruded two-layer sheathing is suitably placed on the pipe/joint. Then the pressing roll has been rolled and pressed onto the sheathing, so as to shape it perfectly on the pipe/joint. The data referring to adherence, impact and C.D. are shown in Table 1.

TABLE 1

| | | | | Examples | | | | |
| --- | --- | --- | --- | --- | --- | --- | --- | --- |
| Test | Method | Condition | Unit | 1 | 2 | 3 | 4 | 5 |
| Adherence at 50° C. | DIN 30678 | Angle 90° Speed 10 mm/min Band width 5 cm | N/mm | >10 | >10 | >10 | >10 | >10 |
| Impact at 23° C. | DIN 30678 | Sphere diameter 25 mm | Nm/mm | >10 | >10 | >10 | >10 | >10 |

TABLE 1-continued

|  |  |  |  | Examples | | | | |
| --- | --- | --- | --- | --- | --- | --- | --- | --- |
| Test | Method | Condition | Unit | 1 | 2 | 3 | 4 | 5 |
| Cathodic Disbonding | British Gas PS-CW6 | 28 days Voltage 1,5 Volt 3% NaCl | mm radius | <10 | <10 | <10 | <10 | <10 |

Figure 7:
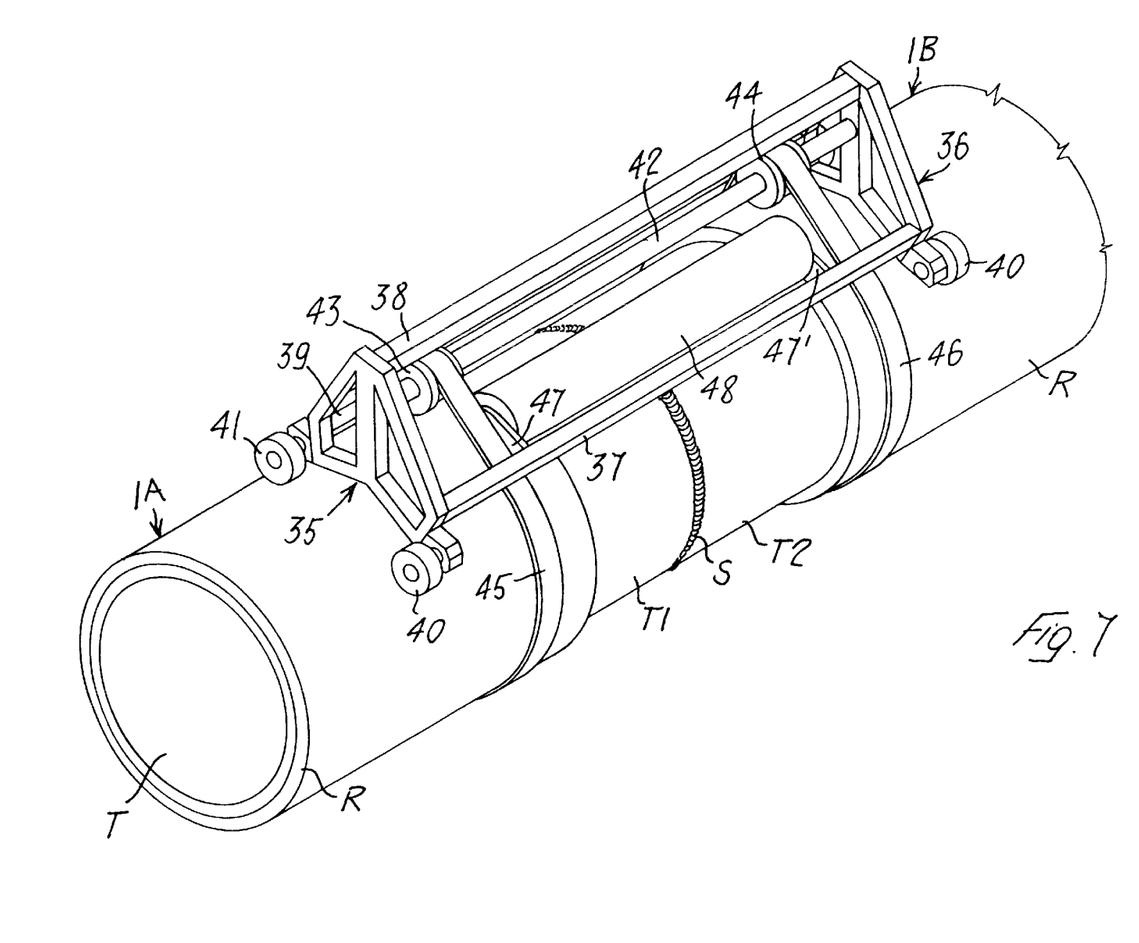
FIG. 7 is an axonometric view of another from of embodiment of the device according to the invention.

III) Description of the Form of Embodiment in FIG. 7

FIG. 7 shows another form of embodiment of the device for the application of the protective sheathing onto the welding area T1 and T2 of two pipes 1A and 1B.

Such structure, preferably made of metal, substantially includes two head parallel elements 35, 36 with a substantially triangular profile, connected one to the other and to their three vertices by means of three connecting rods 37, 38, 39 of suitable length.

Each of the head elements 35, 36 is provided on its base with wheels 40, 41, whose function is to lean onto the pipe portions, respectively 1A and 1B. Under the vertex rod 38, and parallel to it, there is a shaft 42 extending between the head elements 35 and 36, said shaft being supported by said head elements in a free turning way. Near the ends of the shaft 42 two rack wheels 43, 44 are keyed onto said shaft. The numerals 45 and 46 indicate due rack chains which are led respectively around the pipe portions 1A and 1B and around the rack wheels 43, 44, so as to bind firmly the structure described to the pipes to be coated. Said rack chains 45, 46 are open and are provided on their ends with means (not shown in the figure) to close them as a ring.

Two arms 47, 47', having on their ends the easy joining and the pressing elastic means supporting and pressing a pressing roll and carrying a sheathing 48, stretch themselves from one of the base connecting rods, for instance from rod 37 in this case, towards the middle of the structure.

The working of the structure described will now be evident. By rotating the shaft 42 the rack wheels 43 and 44, which are engaged with the rack chains 45 and 46, will move the equipment leaning onto the pipe, by means of the wheels 40 and 41, around the pipe itself.

The structure moving around the pipe can obviously be provided, as for the previous forms of embodiment, with suitable devices for the application of the primer and of the adhesive.

The present invention is obviously not limited to the forms of embodiment shown and described only as a mere non limiting example of the invention itself, but it includes all the variations and changes within the idea underlying the invention itself, as later claimed.

We claim:

1. A method for the anticorrosive protection in situ of a concerned portion of a pipe, comprising the steps of:
    a) preparing of a coating sheathing of a thermoplastic material, the sheathing being configured to cover the concerned portion of the pipe in a single wrapped layer;
    b) pre-wrapping of such sheathing onto a carrying roll which has a same diameter as or a larger diameter than the diameter of the pipe to be coated, and said sheathing is wrapped on said carrying roll in one single wrap layer;
    c) rotating said carrying roll carrying said sheathing around the concerned portion of the pipe so as to transpose the sheathing from the carrying roll and wrap the sheathing onto the concerned portion of the pipe in a single wrapped layer; and
    d) simultaneously with said rotation step, exerting a rolling pressure on the sheathing towards the underlying concerned portion of the pipe, thus obtaining a strong homogeneous adherence of the sheathing to the concerned portion of the pipe without air bubbles entrapped between the sheathing and the pipe.

2. A method according to claim 1, in which said carrying roll applies the rolling pressure.

3. A method according to claim 1, in which said sheathing consists of several composite layers, and said sheathing is coextruded.

4. A method according to claim 1, in which a second carrying roll is used to carry a one-layer second sheathing wrapped around said second carrying roll such that said thermoplastic material and second sheathings together form a multi-layer sheathing on said concerned portion of the pipe.

5. A method according to claim 4, in which said carrying rolls are both cylindrical in shape.

6. A method according to claim 1, in which said carrying roll is idle.

7. A method according to claim 1, in which said carrying roll is motorized.

8. A method according to claim 1, in which said rolling pressure is produced with a roll is made of silicone rubber with a hardness between 5 and 80 Shore A.

9. A method according to claim 8, in which said silicone rubber has a hardness variously distributed in the thickness and in the length of the pressing roll.

10. A method according to claim 1, in which said carrying roll is made of any elastomeric material covered with a silicone rubber or PTFE (polytetrafluoroethylene) film.

11. A method according to claim 1, in which said carrying roll is treated with a detaching agent.

12. A method according to claim 1, in which said carrying roll is made of silicone rubber with a hardness between 5 and 80 Shore A or of PTFE, or of metal coated with PTFE or with silicone rubber with a hardness between 5 and 80 Shore A.

13. A method according to claim 1, in which the carrying roll around which the sheathing is wrapped is introduced into an oven for the preheating of the sheathing, before being brought into touch with the concerned portion of the pipe to be coated.

14. A method according to claim 1, in which a pressing roll is provided downstream, in an unrolling direction, with respect to the carrying roll carrying the sheathing, so as to press said sheathing against the concerned portion of the pipe to be coated.

* * * * *